United States Patent [19]

Bennett

[11] Patent Number: 4,849,655
[45] Date of Patent: Jul. 18, 1989

[54] ACCELEROMETER OR DECELEROMETER FOR VEHICLE BRAKE CONTROL SYSTEM

[75] Inventor: John W. Bennett, Frankston, Australia

[73] Assignee: Hayman-Reese Party, Limited, Australia

[21] Appl. No.: 166,807

[22] Filed: Mar. 3, 1988

Related U.S. Application Data

[62] Division of Ser. No. 881,748, Jul. 3, 1986, abandoned.

Foreign Application Priority Data

Jul. 4, 1985 [AU] Australia .................... 1327/85

[51] Int. Cl.$^4$ .................................... B60T 7/20
[52] U.S. Cl. ........................ 307/309; 307/362; 73/517 R; 73/DIG. 3; 303/24.1
[58] Field of Search .............. 73/517 R, DIG. 3; 188/181 A; 307/121, 10 R, 278, 309, 362, 519; 340/71, 72, 669; 303/24.1

[56] References Cited

U.S. PATENT DOCUMENTS 3,867,844 2/1975 Shimizu et al. ................ 73/517 R
4,498,341 2/1985 Breitbach et al. ............. 73/517 R
4,726,627 2/1988 Frait et al. ..................... 73/517 R

FOREIGN PATENT DOCUMENTS 2709156 9/1978 Fed. Rep. of Germany .... 73/517 R
3016001 10/1981 Fed. Rep. of Germany .... 73/517 R
3021317 12/1981 Fed. Rep. of Germany .... 73/517 R Primary Examiner—John Chapman
Attorney, Agent, or Firm—Sughrue, Mion, Zinn, Macpeak & Seas

[57] ABSTRACT

A sensing device which is suitable for use as a decelerometer comprises a magnetic field producing element and a Hall effect sensor element with one of the elements supported for movement relative to the other. The arrangement is such that when the device undergoes acceleration or deceleration the support allows relative movement between the elements so that the sensor element produces an output indicative of the change in field the sensor element detects from the field producing element due to the relative movement between the elements to thereby provide an indication of acceleration or deceleration of the device. The output of the sensor is connected to a differential amplifier, and the output of the amplifier is connected to a transistor in parallel with a capacitor. When the device undergoes deceleration, the output signal of the sensor increases, causing the output voltage of the differential amplifier to decrease, which in turn causes the voltage across the capacitor to discharge.

2 Claims, 2 Drawing Sheets

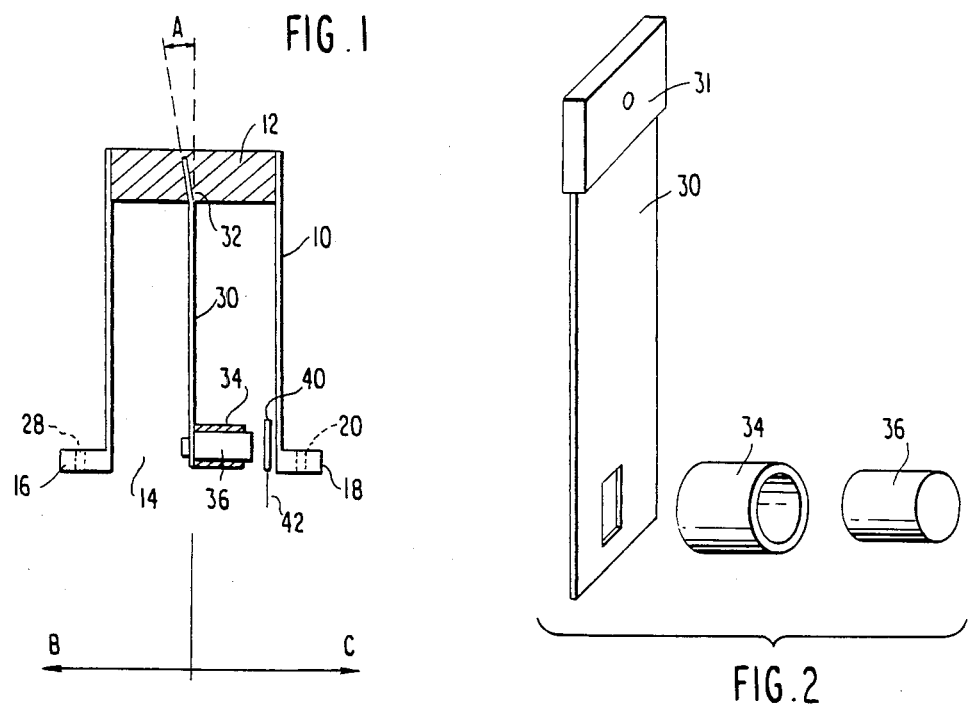
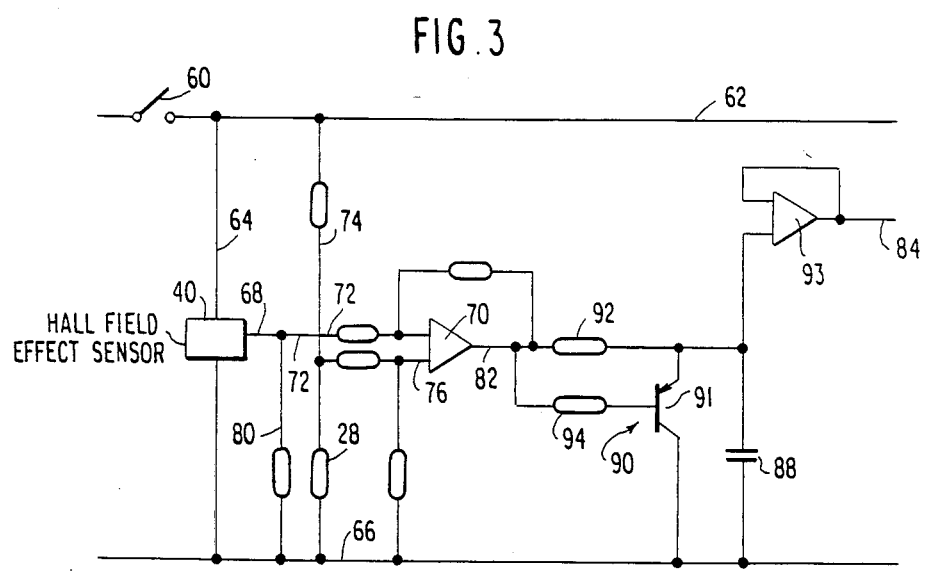

ACCELEROMETER OR DECELEROMETER FOR VEHICLE BRAKE CONTROL SYSTEM

This is a division of application Ser. No. 881,748 filed 7/3/86, abandoned.

This invention relates to a sensing device which is suitable for sensing a change in motion and/or attitude of a body and in a more specific and preferred form the present invention relates to an accelerometer or decelerometer (hereinafter referred to as a decelerometer device) for a brake control system or for other systems in which it is desired to detect a change in motion.

The present invention has particular application, but not exclusive application, to towing and towed vehicle combinations, for example, motor cars and caravans and trucks and trailers. When a caravan or trailer is towed it is desirable to provide a brake control system which causes the solenoid operated brakes of the trailer or caravan to be applied a short period before the brakes of the towing vehicle and to remain on while the towing vehicle brakes are on and for a short time after the towing vehicle brakes are released. If the brakes of the trailer or caravan are not applied momentarily before the brakes of the towing vehicle, braking of the towing vehicle can cause the towing vehicle and caravan or trailer to jack knife. Brake control systems for causing the application of the brakes of a towed vehicle are known. One example of such a control system comprises an astable oscillator whose mark period is fixed while its space period is varied by the amount of light falling on a light dependent resistor. The greater the amount of light falling on the resistor, the higher the output frequency of the oscillator. A deceleration activated pendulum controls the amount of light falling on the resistor. A mechanical damping mechanism is utilized to dampen the return of the pendulum. Circuitry is provided which operates in response to activation of the brake light circuit of the towing vehicle to lightly apply the brakes of the towed vehicle. When the towing vehicle begins to decelerate the circuitry receives the output of the oscillator and increases the application of the towed vehicles brakes.

The decelerometer used in the above mentioned brake control system is relatively expensive to manufacture and assemble and has been found, in some instances, to be unreliable.

It is an object of the present invention to provide an improved sensing device which is suitable for use in the aforementioned application and other applications which is relatively simple and reliable.

It is a preferred object of this invention to provide a relatively less expensive decelerometer device which can reliably produce a signal depending on the deceleration or acceleration of an object such as a towing vehicle.

The invention may in one aspect be said to reside in a decelerometer device, said device having a field producing element and a field sensor element, means for supporting one of said field sensor element or said field producing element for movement relative to the other of said field sensor element or said field producing element such that when said device undergoes acceleration or deceleration the supporting means allows movement of said one of said field sensor element or field producing element relative to the other of said field sensor element or field producing element so that the sensor element produces an output indicative of the change in field the sensor element detects from the field producing element due to the relative movement between the elements to thereby provide an indication of acceleration or deceleration of the device.

Preferably the field producing element comprises a magnet so that the field produced is a magnetic field and the sensor element is a magnetic field sensor such as a Hall field effect sensor.

Preferably the magnet is supported adjacent to the Hall field effect sensor and moves away from said Hall field effect sensor under the influences of acceleration or deceleration.

Preferably the supporting means comprises a spring element pendulum or nylon line.

The invention may also in another aspect be said to reside in a decelerometer device, said device having a first element and a second element, means for supporting one of said first element or said second element for movement relative to the other of said first element or second element such that when said device undergoes acceleration or deceleration the supporting means allows movement of said first element or second element relative to the other of said first element or second element, and means for detecting said relative movement to thereby provide an indication of acceleration or deceleration of the device.

According to a further aspect of the present invention there is provided a sensing device comprising two parts which are moveable relative to one another, one of the parts including an actuator, and the other of the parts including a controller which is adapted to provide a variable output determined by the relative positions of the controller, and the actuator, the arrangement being such that, in use, said controller can provide an output as a result of a change in movement and/or attitude of a body which movement causes a change in the relative disposition of the two parts.

Preferred embodiments of the invention will be described with reference to the accompanying drawings in which:

FIG. 1 is a cross-sectional view of a decelerometer device embodying the invention;

FIG. 2 is an exploded view of some of the parts of the device shown in FIG. 1;

FIG. 3 is a circuit diagram in which the device of FIG. 1 can be included;

Figure 4:
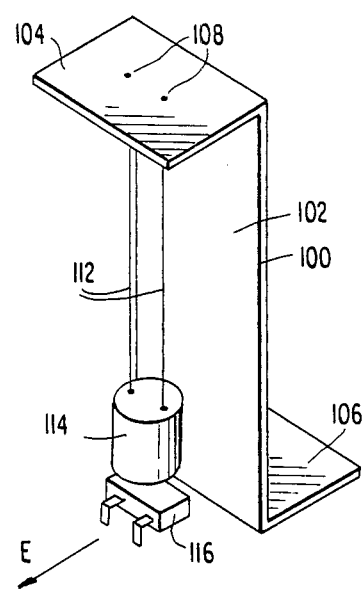
FIG. 4 is a perspective view of a second embodiment of the invention.

With reference to FIG. 1 the decelerometer device comprises a housing 10 which is provided with an end plug 12. The other end of the housing 14 may be left open and is provided with two leg portions 16 and 18 which have holes 28 and 20. The housing 10 may be of any desired shape such as cylindrical or square in cross-section.

A spring steel or beryllium copper flat spring pendulum 30 is retained by the plug 12. It will be noted that the pendulum 30 is retained in a slit 32 in the plug 12 which is formed at an angle A to be vertical. The free end of the pendulum 30 supports a holder 34 which holds a magnet 36. The holder 34 may be made from steel which enables the magnet 36 to be held therein by magnetic attraction and holder 34 can be coupled to the pendulum 30 by means of adhesive or by a screw or the like which passes through an aperture in the pendulum 30. In other embodiments the holder 34 could be provided with a clip which is placed through the aperture in the pendulum 30 to secure the holder 34.

As is shown in FIG. 2, the pendulum 30 may be provided with an enlarged end 31 which is retained in the slit 32 in plug 12 and the end 31 may have a hole for receiving a securing pin to secure the pendulum 30 in the plug 12. As also shown in FIG. 2 the holder 34 may be cylindrical and the magnet 36 may also be cylindrical.

A magnetic field sensor, for example, a Hall field effect sensor 40 is provided on the housing 10. Electrodes 42 project downwardly from the sensor 40.

The arrangement of the slit 32 at an angle A to the vertical causes the pendulum 30 to be biased such that the magnet 34 is adjacent to the Hall field effect sensor 40. If the slit was not arranged at an angle A to a vertical the fact that the holder 34 and magnet 36 are arranged as shown in FIG. 1 would tend to cause the centre of gravity of the magnet 36 to take a position directly beneath the slit 32 which would displace the magnet 36 well away from the Hall field effect sensor 40 which in turn would decrease the sensitivity of the device.

The position of the magnet 36 relative to the sensor 40 is the position which the elements take up when the device is at rest or is undergoing constant velocity. The magnetic field which is sensed by the Hall field effect sensor 40 is therefore relatively high in view of the close proximity of the magnet 36 relative to the sensor 40. Assuming that the device is connected to a vehicle or the like which is undergoing motion in the direction of arrow B and is arranged as is shown in FIG. 1 relative to that direction of motion, the device will act as a decelerometer. If the vehicle or object decelerates the deceleration will cause the pendulum 30 to move in the direction of arrow B away from the Hall field effect sensor 40. The Hall field effect sensor will therefore detect a decrease in magnetic field due to the movement of the magnet 36 away from the sensor 40. The output from the sensor 40 will therefore alter in accordance with the variation of the magnetic field which it detects. Movement of the pendulum 30 and the magnet 36 at the side of the housing 10 opposite the Hall field effect sensor 40 so that the magnet is approximately 1 c.m. from the sensor 40 will increase the output of the sensor 40 in the order of about 1 volt (dependent on the type of sensor used).

If the device is arranged on a vehicle or object which is moving in the direction of arrow C the device will act as an accelerometer and acceleration of the vehicle or device will cause the magnet to move in exactly the same manner as described above to therefore alter the output of the Hall field effect sensor 40 in the manner described above.

FIG. 3 shows a circuit diagram for receiving the output of the sensor 40 and producing an appropriate control signal which can be provided to a towed vehicle braking system for causing the application of the brakes on the towed vehicle.

Since it is only desired that the application of the brakes take place when the brakes of the towing vehicle are being applied it is desirable to power the circuit shown in FIG. 3 only upon application of the brakes of the towing vehicle. One preferred manner of powering the circuit when the brakes of the towing vehicle are applied is to supply power to the circuit through the brake stop switch which is activated on application of pressure to a brake pedal in the towing vehicle. The application of the pressure to the brake pedal in the towing vehicle which causes the brake stop switch to close occurs slightly prior to the actual application of the brakes in the towing vehicle. Thus, the circuit shown in FIG. 3 will be powered when the brakes on the towing vehicle are applied and the device shown in FIG. 1 senses deceleration. The brakes of the towed vehicle are electrically connected to the towing vehicle brake light circuit as in conventional systems so that the brakes of the towed vehicle are lightly applied slightly before the pressure applied on the brake pedal of the towing vehicle is sufficient to cause application of the towing vehicle brakes. Delay in the application of the towing vehicle brakes caused by slack in the brake linkage also ensures that the towed vehicle brakes are lightly applied before the towing vehicle begins to brake.

The circuit shown in FIG. 3 comprises the sensor 40 coupled to a source of voltage, such as a vehicle 12 volt battery, via a stop switch 60. When the switch 60 is closed a voltage will be applied to the sensor 40 along lines 62, 64 and 66. The sensor 40 is biased with a voltage of approximately 4.0 volts on line 80. The output on line 72 is therefore the bias voltage of 4.0 volts plus the output of sensor 40. The output of the sensor 40 which is indicative of the magnetic field it senses is applied to the negative input of a differential amplifier 70 on lines 68 and 72. The other input to the differential amplifier 70 receives a reference voltage of 5.4 volts from lines 62 on lines 74 and 76. A variable resistor may be provided to enable the reference voltage applied to the differential amplifier 70 on line 76 to be adjusted. The reference voltage on line 74 balances the bias voltage on line 72 from the sensor 40 to produce a maximum output on a differential amplifier 70 when the magnet 36 is in the position shown in FIG. 1 indicative of constant velocity of the device. If the device undergoes deceleration the output from the sensor 40 increases as described above thereby increasing the voltage applied to the differential amplifier 70 on line 72. The output from the differential amplifier 70 therefore decreases and is supplied to a charge pumping circuit 90. An output voltage is then applied to the braking system of the towed vehicle which increases the braking of the towed vehicle. The circuit 90 includes a capacitor 88 and enables the voltage applied from the differential amplifier 70 to reduce rapidly by virtue of the rapid discharge from the capacitor 88 through the transistor 91 which is biased by the output of amplifier 70. When deceleration stops, the output of amplifier 70 rises to its normal level. Transistor 91 is now reversed biased and capacitor 88 charges slowly through resistor 92. By adjusting the value of resistor 92 different charge up rates can be obtained to suit the weight of the vehicle using the system. A voltage is therefore maintained at terminal 84 through buffer amplifier 93 so that the brakes of the towed vehicle are not quickly deactivated when the magnet 36 returns to its position adjacent the sensor 40 to prevent rapid intermittent application of the brakes on the towed vehicle.

When the brakes of the towing vehicle are not applied and the switch 60 is open the circuit shown in FIG. 3 is not powered so that any acceleration or deceleration sensed by the device due to slight variations in speed during the course of normal driving do not cause the application of the brakes of the towed vehicle.

By selection of appropriate values of capacitor 88 and resistances 92 and 94 a desired delay in discharge of the capacitor can be obtained to enable a voltage to be held at terminal 84 for a desired period of time. The circuit 90 effectively dampens the return of the magnet 36 to the position shown in FIG. 1 without the need for mechanical damping as was the case in the prior art and the fact that no mechanical damping is required enables the magnet 36 to return quickly to the position shown in FIG. 1 whilst maintaining slow decay of the voltage at output terminal 84.

The preferred embodiment of the invention therefor provides a decelerometer device for producing a signal indicative of deceleration or acceleration of an object such as a vehicle which can be used in a brake control system for causing the application of the brakes on a towed vehicle. The device is also relatively inexpensive to produce.

The housing 10 can be applied to a circuit board on which the circuit shown in FIG. 3 is printed by arranging the leads 16 so that they sit on the circuit board and providing suitable fasteners through the holes 28 and 20. The terminals 42 of the sensor 40 may therefore be directly connected to the lines 64, 68 and 66 on the printed circuit board.

With reference to FIG. 4 which shows a second embodiment of the invention a non-ferrous bracket 100 which has an upright portion 102 and two oppositely extending end portions 104 and 106 is secured to the circuit board on which the circuit shown in FIG. 3 is arranged by connecting the portion 106 to the circuit board. The portion 104 includes a pair of holes 108 which are used to support a nylon line 112 which secures a magnet 114 above a hall effect sensor 116.

Figure 5:
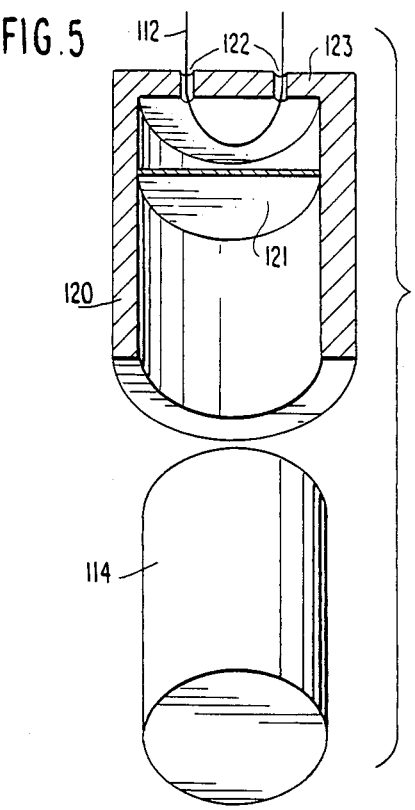
FIG. 5 shows one method of mounting the second embodiment.

FIG. 5 shows one method of supporting the magnet 114 in which the magnet 114 is glued into a cap 120 and a nylon line 112 is passed through two openings 122 in the cap and is retained in the end portion 104 by passing the ends of the line 112 through the holes 108 and knotting and gluing the ends of the line 112 so that they are secured in the portion 104. A disc 121 which may be made from lead or other relatively heavy material is located in the cap so that when the embodiment of FIG. 5 is assembled the disc 121 is sandwiched between the magnet 114 and base 123 of the cap 120. The line 112 is therefore firmly held between the disc 121 and base 123. The disc 123 also adds weight to the assembly so as to increase its inertia. This provides a more reliable assembly as the cap to which it is coupled accelerates or decelerates and will not tend to bounce about to any great extent due to vibration or the like.

Figure 6:
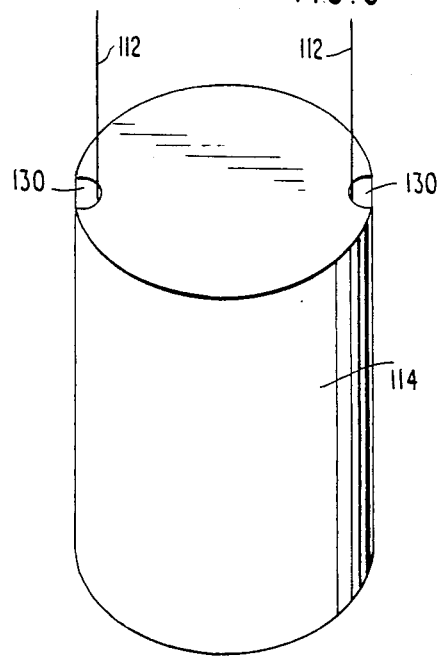
FIG. 6 shows, another method of mounting a second embodiment.

In another method shown in FIG. 6 the magnet 114 could be provided with grooves 130 and the line 112 could be received in the grooves 130 and glued in place.

Figure 7:
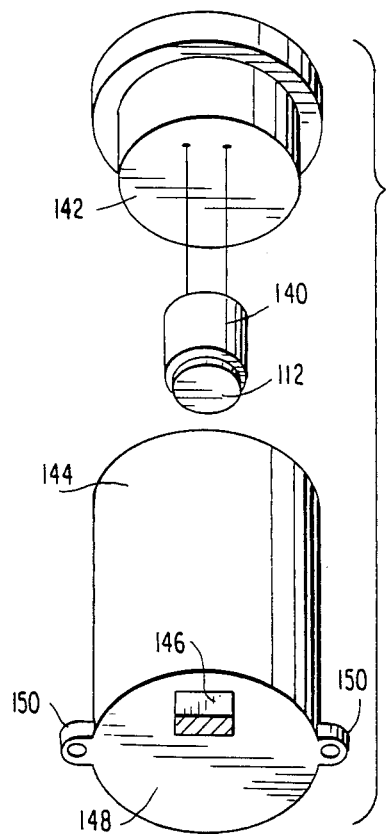
FIG. 7 shows yet another method of mounting the second embodiment.

In FIG. 7 the magnet 112 is arranged in a magnet housing or cap 140 which is suspended from an end cap 142. The end cap 142 seals a decelerometer housing 144 and the decelerometer housing 144 has an opening 146 in its base 148. The opening 146 is adapted to be arranged over the Hall effect sensor 116 which is mounted through the circuit board. In this embodiment the housing 144 is mounted to the circuit board by suitable nails, screws or bolts etc. which pass through holes in lugs 150. The operation of the embodiment shown in FIGS. 4 to 7 is exactly the same as the operation of the embodiments shown in FIGS. 1 to 3. It should be noted that the device shown in FIG. 4 is arranged relative to the direction of motion of a vehicle which is given by arrow B so that upon slowing of the vehicle the magnet 114 is free to move in the direction of arrow E away from the sensor 116 to alter the magnetic field sensed by the sensor 116 and therefore the output voltage of the sensor 116.

Since modification within the spirit and scope of the invention may readily be effected by persons skilled within the art, it is to be understood that this invention is not limited to the particular embodiment described by way of example hereinabove.

I claim:
1. A decelerometer device comprising:
   a magnetic and a Hall field effect sensor which are positioned adjacent one another when said device undergoes substantially constant motion and are supported such that they move relative to one another when said device undergoes acceleration or deceleration, said sensor generating an output signal representative of the extent of said relative movement;
   a differential amplifier connected to said sensor and adapted to receive said output signal of said sensor; and
   a capacitor connected to the output of said differential amplifier; and
   a discharge circuit including a transistor connected to the output of said amplifier and in parallel with said capacitor and a bias resistor connected between said transistor and said amplifier
   wherein when said device undergoes deceleration, said output signal increases causing the output voltage to said amplifier to decrease correspondingly, which in turn causes the voltage across said capacitor to drop correspondingly.
2. A decelerometer device as claimed in claim 1, further comprising charging means for charging the capacitor gradually once said device ceases to undergo deceleration, wherein said charging means includes a coupling resistor connected between said capacitor and the output of said amplifier.

* * * * *